(12) United States Patent  (10) Patent No.: US 9,225,902 B1
Mohr  (45) Date of Patent: Dec. 29, 2015

(54) VIBRATION ATTENUATING CAMERA MOUNT

(71) Applicant: Ryan J. Mohr, Maple Grove, MN (US)

(72) Inventor: Ryan J. Mohr, Maple Grove, MN (US)

( * ) Notice: Subject to any disclaimer, the term of this patent is extended or adjusted under 35 U.S.C. 154(b) by 0 days.

(21) Appl. No.: 14/735,373

(22) Filed: Jun. 10, 2015

Related U.S. Application Data (60) Provisional application No. 62/009,982, filed on Jun. 10, 2014.

(51) Int. Cl.
- *H04N 5/225* (2006.01)
- *H04N 5/228* (2006.01)
- *G03B 17/00* (2006.01)
- *H04N 5/232* (2006.01)

(52) U.S. Cl.
CPC .......... *H04N 5/2328* (2013.01); *H04N 5/2251* (2013.01)

(58) Field of Classification Search
CPC . H04N 5/2252; H04N 5/2251; H04N 5/2254; H04N 2201/02466; G08B 13/19632
USPC .......................... 348/373–376, 208.1–208.99; 396/419–428
See application file for complete search history.

(56) References Cited

U.S. PATENT DOCUMENTS

| | | | | |
|---|---|---|---|---|
| 6,513,769 | B1 * | 2/2003 | Chapman | 248/125.1 |
| 8,919,962 | B2 * | 12/2014 | Aikoh | 353/20 |
| 8,945,795 | B2 * | 2/2015 | Berggren et al. | 429/535 |
| 2003/0202114 | A1 * | 10/2003 | Takizawa et al. | 348/335 |
| 2004/0007077 | A1 * | 1/2004 | Hijikata | 73/799 |
| 2004/0022023 | A1 * | 2/2004 | Kimura et al. | 361/685 |
| 2004/0022534 | A1 * | 2/2004 | Amano et al. | 396/427 |
| 2007/0164176 | A1 * | 7/2007 | Liao | 248/176.3 |
| 2013/0056939 | A1 * | 3/2013 | Sturm et al. | 277/628 |
| 2014/0346750 | A1 * | 11/2014 | Liu et al. | 280/124.177 |
| 2015/0183149 | A1 * | 7/2015 | Chow et al. | 425/200 |

* cited by examiner

*Primary Examiner* — Chia-Wei A Chen
(74) *Attorney, Agent, or Firm* — Skaar Ulbrich Macari, P.A.

(57) ABSTRACT

A high definition video camera mounting system includes the camera fastened to a camera mount assembly via a central mounting post. The mounting assembly includes a first vibration dampening gasket, a second vibration dampening gasket, a mounting plate sandwiched between the first and second gaskets, and a backing plate disposed behind one of the gaskets. The mounting system allows a camera to capture HD video while mounted to a vehicle or aircraft without experiencing an unacceptable amount of wobble distortion effect. The mounting system can be fastened to an adjustable angle block.

19 Claims, 14 Drawing Sheets

VIBRATION ATTENUATING CAMERA MOUNT

PRIORITY

This application claims the priority benefit of U.S. Provisional Application No. 62/009,982 filed on Jun. 10, 2014, which is hereby incorporated herein by reference in its entirety.

FIELD

The present invention relates to camera mounting systems and devices, and more particularly to mounting systems, methods and devices that reduce wobble in high definition (HD) video caused by vibration.

BACKGROUND

Many conventional HD video cameras use CMOS (complementary metal oxide semiconductor) technology for their digital video image sensors. This technology allows anyone to record high definition video with an affordable camera having a compact size. However, such technology is susceptible to undesirable rolling shutter distortion effects when such cameras are used in high speed and high vibration environments.

The most common type of undesirable rolling shutter distortion effect in HD video is wobble. Wobble is often referred to as "jello effect". Jello effect or wobble often is encountered when the camera is vibrating, typically due to being attached to a moving vehicle, for example. The rolling shutter causes the image to wobble unnaturally and bizarrely.

The wobble or jello effect problem is a result of one or both of two main causes. One cause is vibration, such as engine vibration, transferred through the vehicle frame and then transferred through the camera mount to the camera. The other is air buffeting. Disrupted airflow at high speeds causes the camera to vibrate due to flex or play in the camera's mount.

Accordingly, there is a continuing need to provide an improved camera mount that reduces or eliminates the wobble distortion effect in environments where vibrations and/or airflow would otherwise induce wobble.

SUMMARY

The invention includes mounting devices, systems and methods that allow a video camera to capture high definition video while mounted to a vehicle, aircraft or other vibration inducing apparatus without experiencing an unacceptable amount of wobble distortion effect in the recorded video.

Disclosed is a high definition video camera mounting system includes the camera fastened to a camera mount assembly via a central mounting post. The mounting assembly includes a first vibration dampening gasket, a second vibration dampening gasket, a mounting plate sandwiched between the first and second gaskets, and a backing plate disposed behind one of the gaskets. The mounting system allows a camera to capture HD video while mounted to a vehicle or aircraft without experiencing an unacceptable amount of wobble distortion effect. The mounting system can be fastened to an adjustable angle block.

Also disclosed is a camera mounting system. The system includes a mounting plate including a first side, an opposing second side, an upper body portion and a flange portion adjacent to the upper body portion. The upper body portion includes a central aperture defined therethrough. A first gasket includes a first side and an opposing second side. The first side of the gasket is disposed against the first side and upper body portion of the mounting plate. The first gasket includes a central aperture defined therethrough. A second gasket includes a first side and an opposing second side. The first side of the gasket is disposed against the second side and upper body portion of the mounting plate. The second gasket includes a central aperture defined therethrough. A backing plate includes a first side and an opposing second side. The first side of the backing plate is disposed against the second side of the second gasket. The backing plate includes a central aperture defined therethrough. A camera mounting stud is disposed through the central aperture of each of the first gasket, the second gasket, the upper body portion of the mounting flange, the second gasket and the backing plate. A rear nut is coupled to the mounting stud and disposed adjacent to the second side of the backing plate. The first gasket and the second gasket each comprise a vibration dampening material.

Further disclosed is a vibration attenuating camera mounting assembly for a high definition video camera. The assembly includes a rigid backing plate, a mounting plate including a first side and a second side, a first vibration dampening gasket disposed between the backing plate and the mounting plate, and contacting the first side of the mounting plate, and a second vibration dampening gasket disposed adjacent to and contacting the second side of the mounting plate. A mounting stud extends through each of the backing plate, the mounting plate, the first vibration dampening gasket and the second vibration dampening gasket. A fastener is coupled to the mounting stud and disposed adjacent to the backing plate.

Additionally disclosed is a method of reducing rolling shutter distortion effects in high definition video recordings. The method includes disposing a first vibration dampening gasket on a first side of a mounting plate so that an inner surface of the first vibration dampening gasket contacts the mounting plate. A second vibration dampening gasket is disposed on a second side of the mounting plate so that an inner surface of the second vibration dampening gasket contacts the mounting plate. A rigid backing plate is disposed against an outer surface of the second vibration dampening gasket. A camera mounting stud is inserted through a central aperture extending through each of the mounting plate, the backing plate, the first vibration dampening gasket and the second vibration dampening gasket. A high definition video camera is coupled to a first end portion of the camera mounting stud. A fastener is coupled to a second end portion of the camera mounting stud, the second end portion being opposite the first end portion. The fastener is tightened to secure the high definition video camera against an outer surface of the first vibration dampening gasket.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The various features or aspects discussed herein can also be combined in additional combinations and embodiments, whether or not explicitly discussed herein, without departing from the scope of the invention. Note that references to a "first" or "second," etc. of any component or surface, or portion of a component is simply for convenient description purposes and does not specific imply order unless explicitly so stated.

Figure 1:
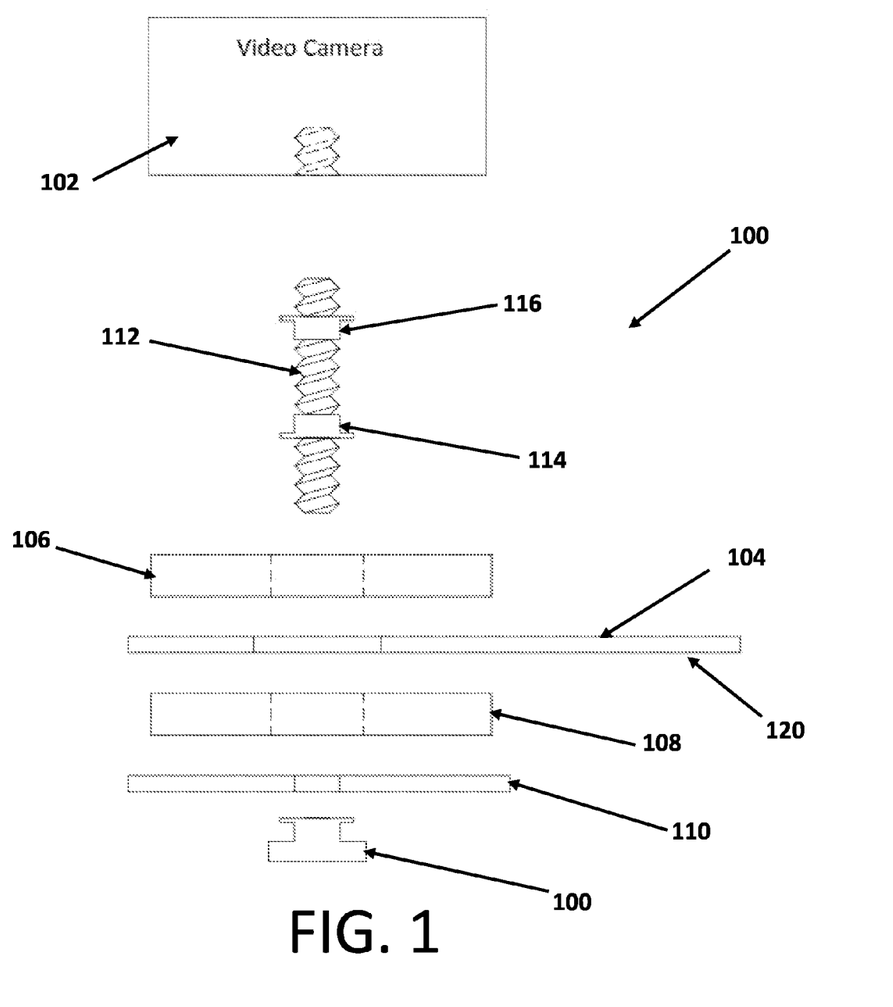
FIG. 1 is an exploded side view of a camera and camera mounting system according to certain embodiments.
Figure 2:
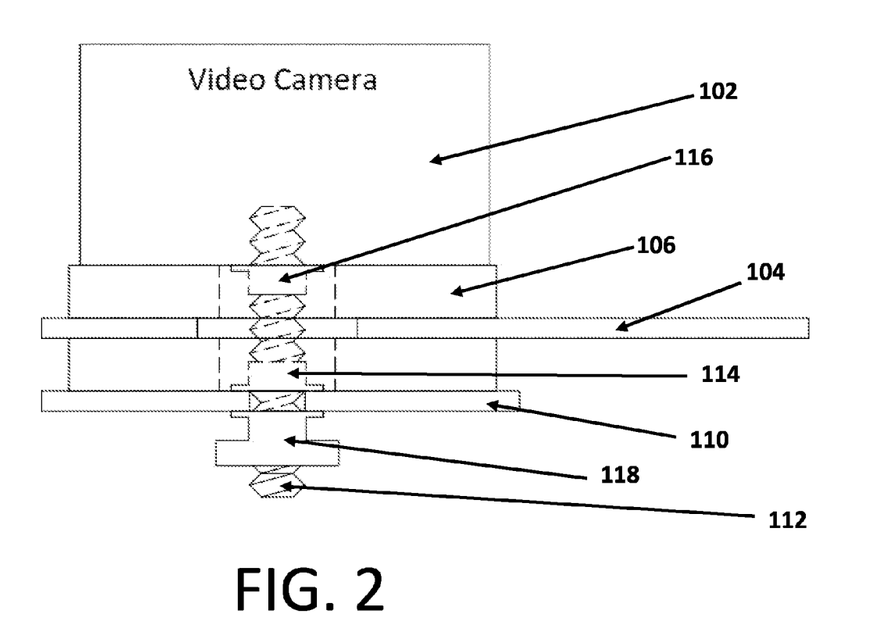
FIG. 2 is a side view of the camera and camera mounting system of FIG. 1 in an assembled state according to certain embodiments.
Figure 3:
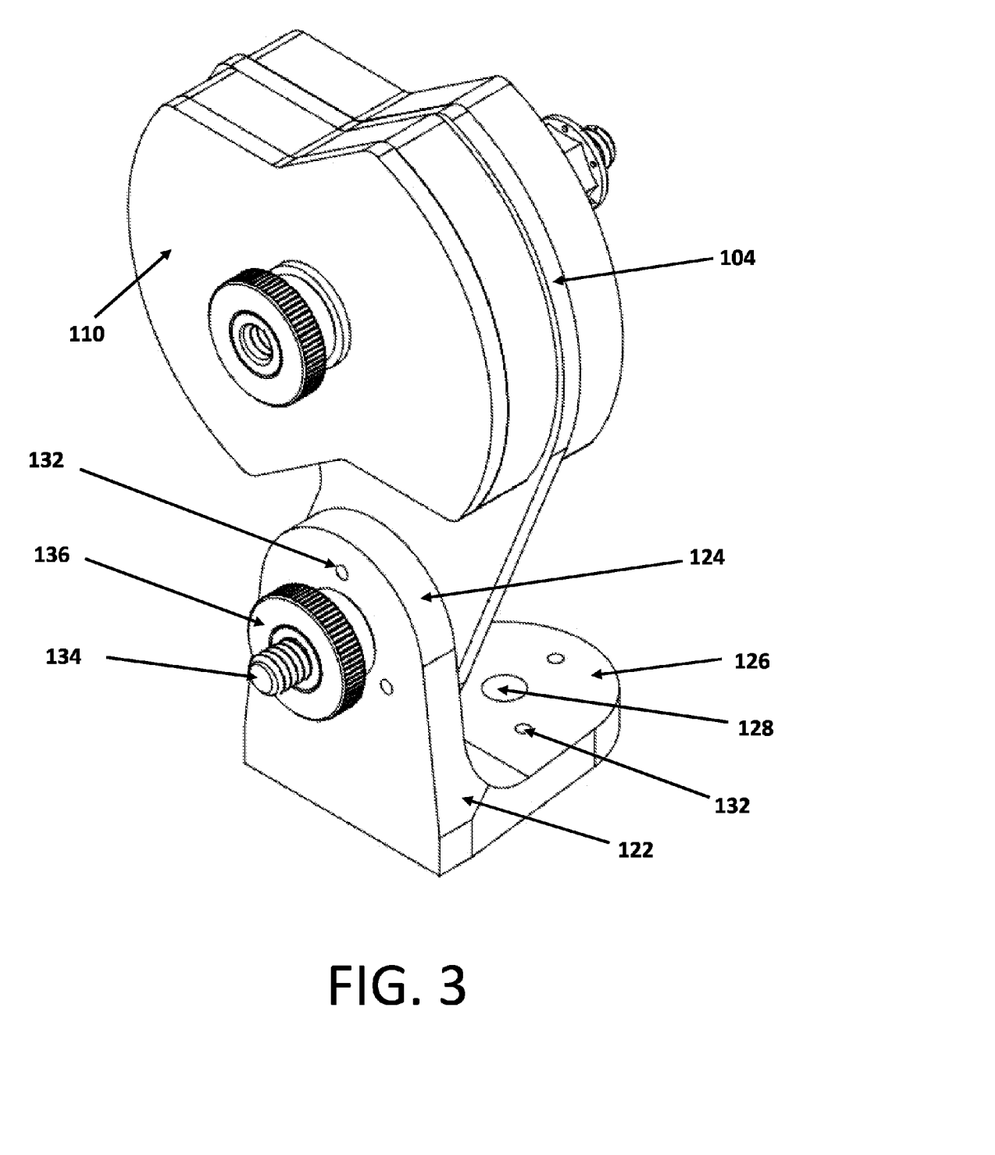
FIG. 3 is a perspective view of a camera mounting system according to certain embodiments.
Figure 4:
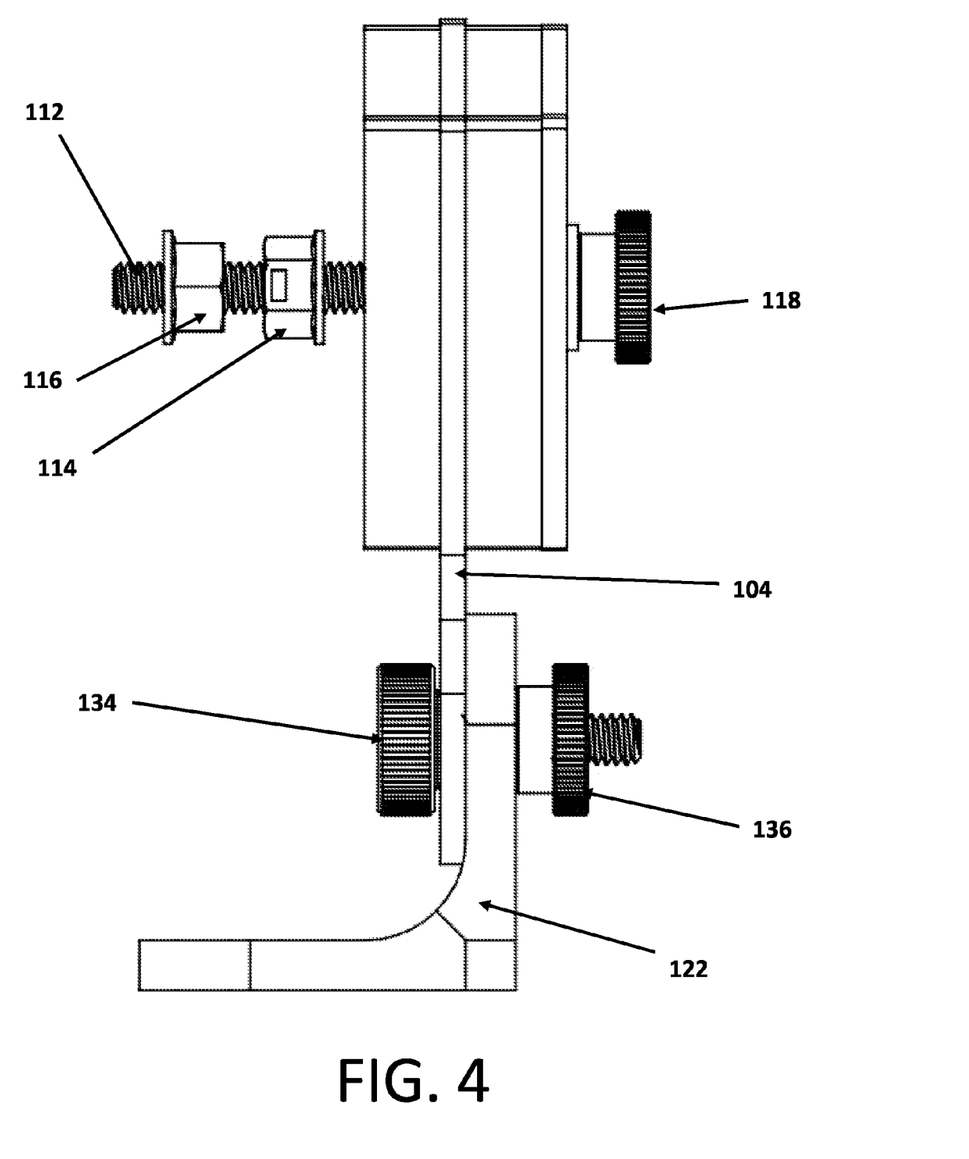
FIG. 4 is a front side view of a camera mounting system according to certain embodiments.
Figure 5:
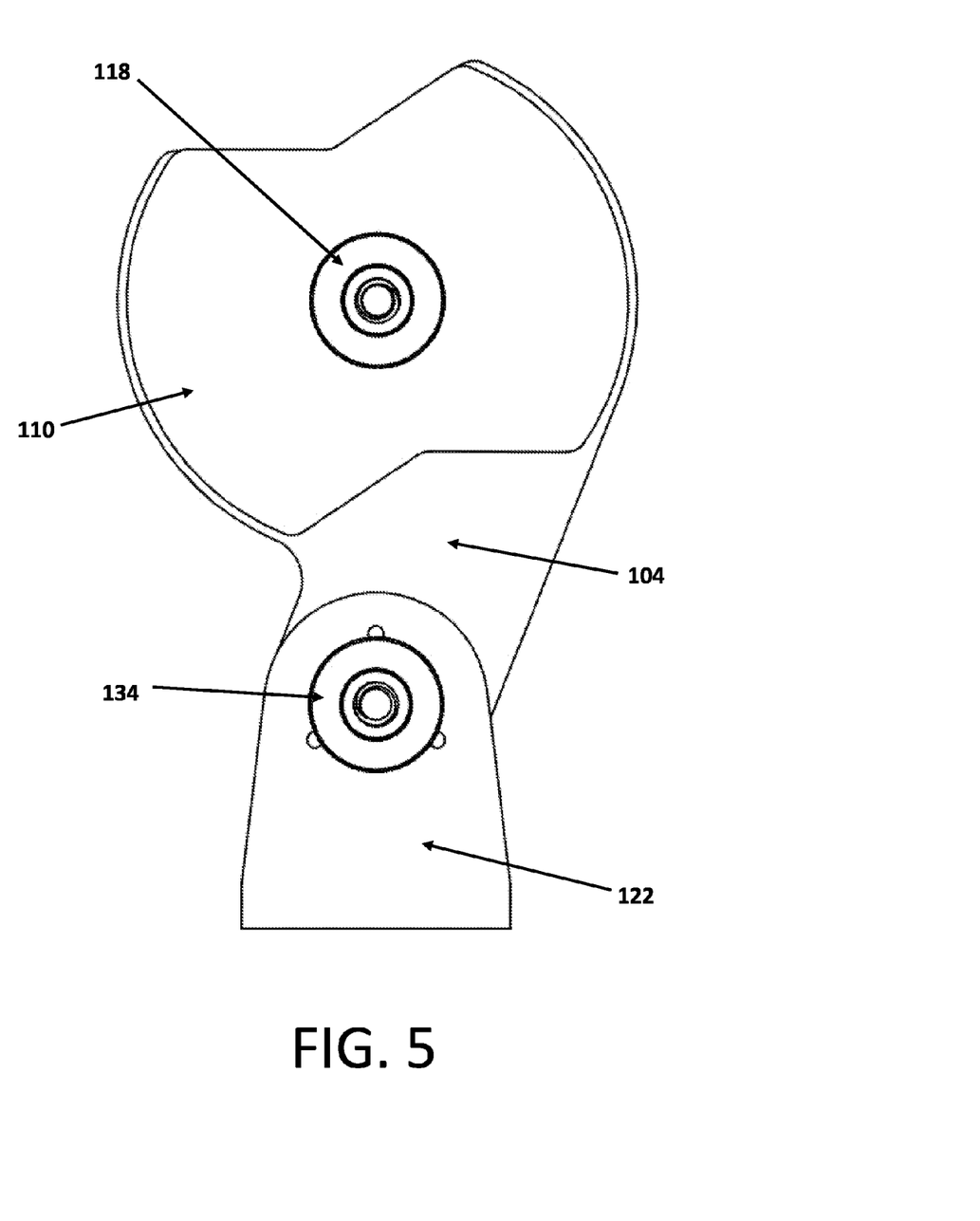
FIG. 5 is a first side view of a camera mounting system according to certain embodiments.
Figure 6:
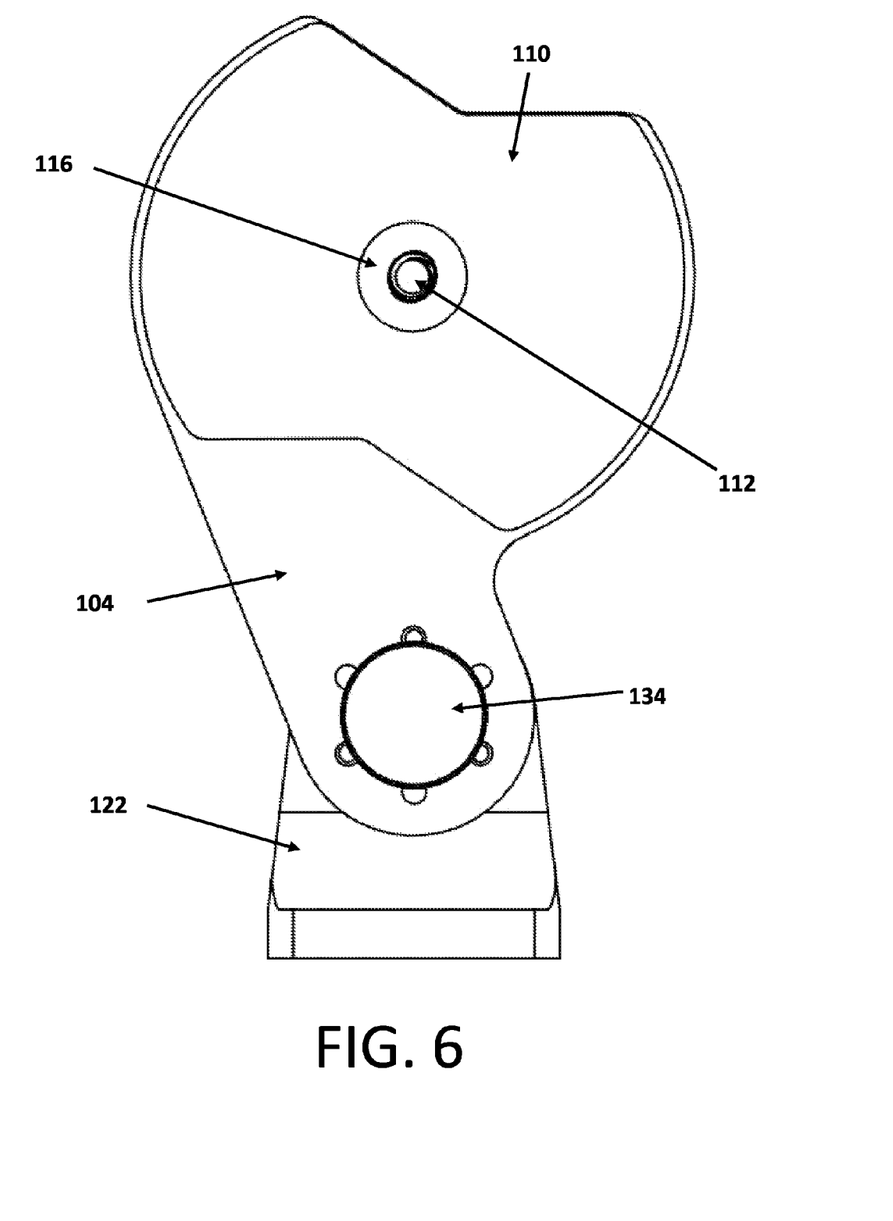
FIG. 6 is a second side view of a camera mounting system according to certain embodiments.
Figure 7:
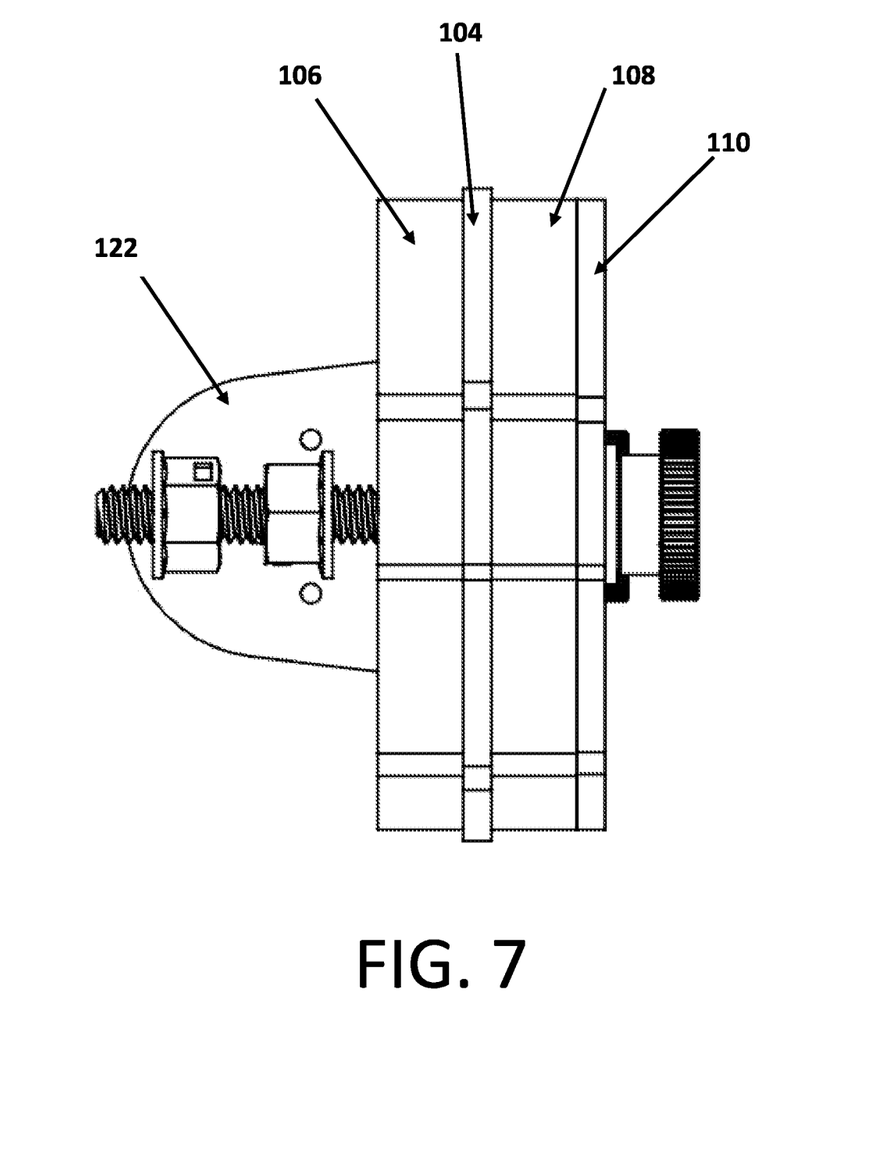
FIG. 7 is a top view of a camera mounting system according to certain embodiments.
Figure 8:
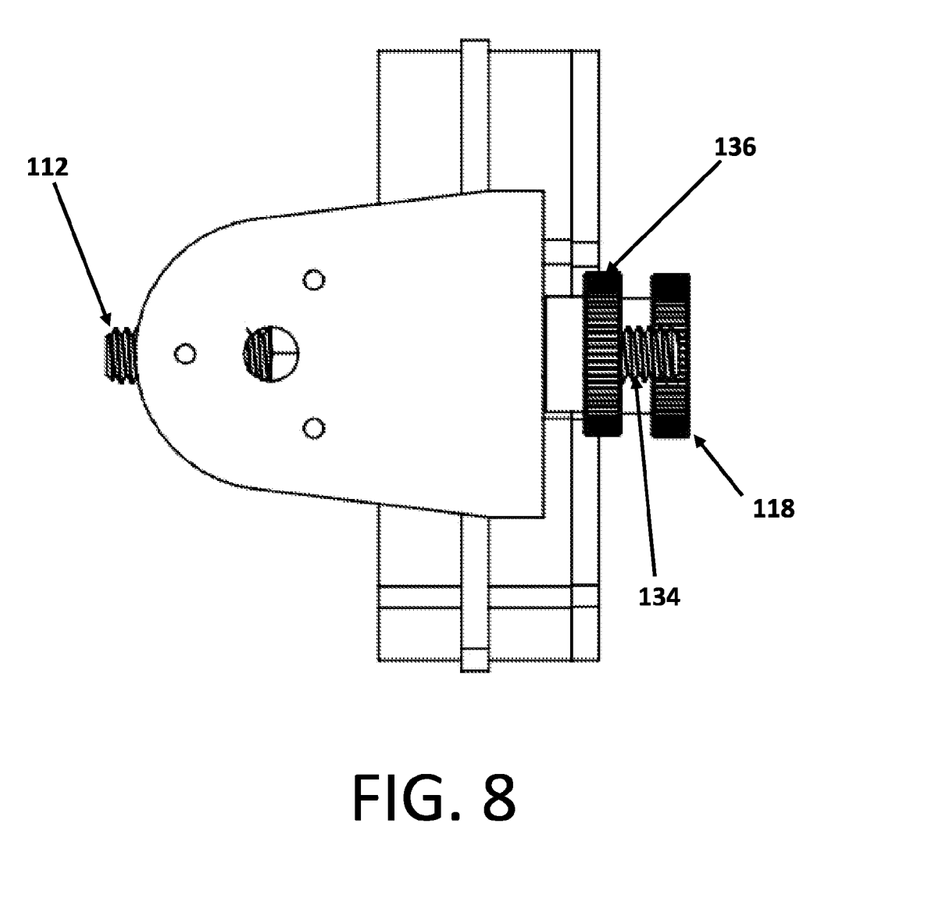
FIG. 8 is a bottom view of a camera mounting system according to certain embodiments.
Figure 9:
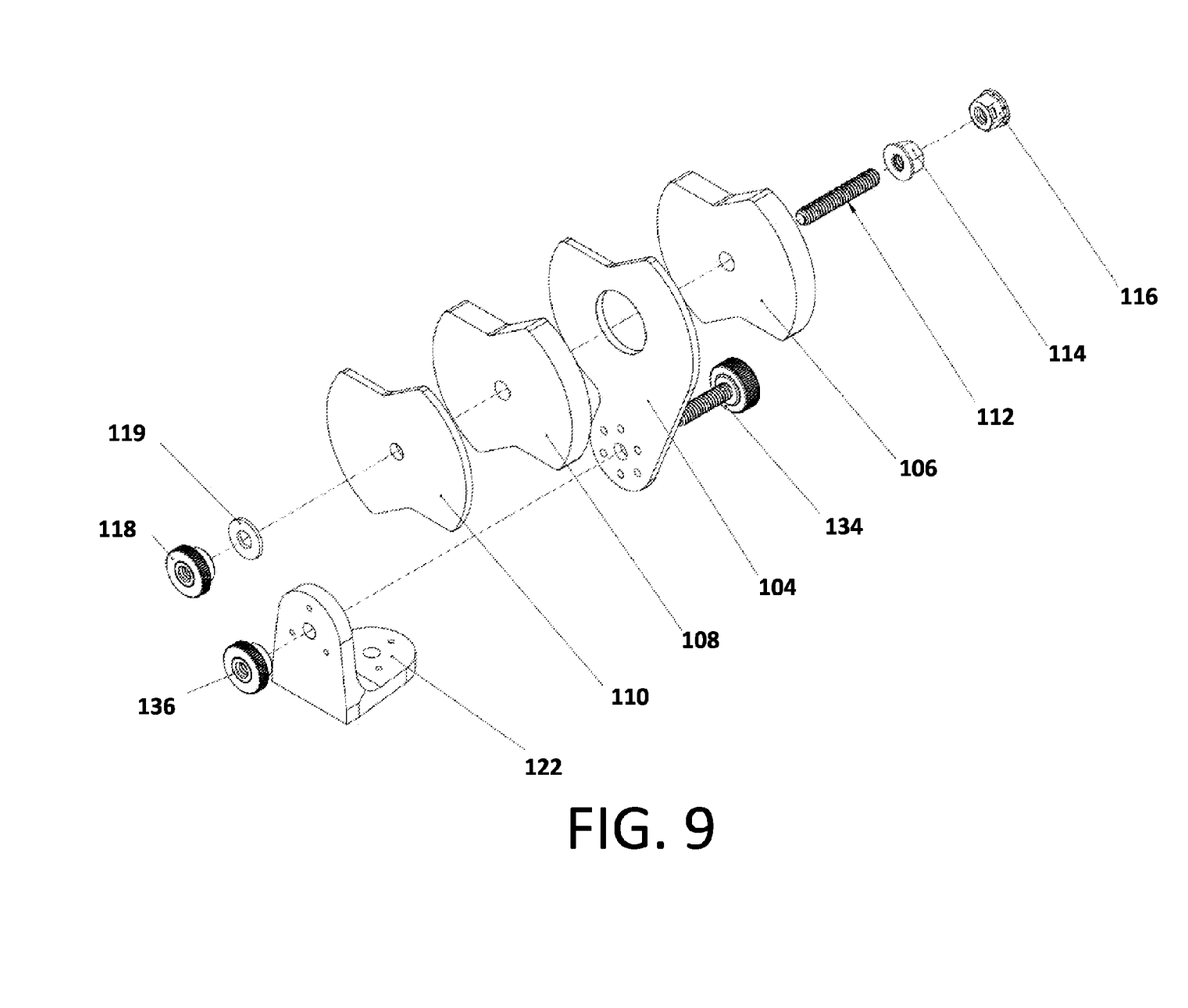
FIG. 9 is an exploded perspective view of a camera mounting system according to certain embodiments.

Referring to FIGS. 1-2 and 9, in the camera mounting system 100, a camera 102 is fastened to the camera mounting assembly 100 via a mounting post or stud 112. The camera mount assembly 100 includes a mounting plate 104 with flat or generally flat first and second sides. A first rubber layer or gasket 106 contacts a first side of the mounting plate. A second rubber layer or gasket 108 contacts a second side of the mounting plate. A backing plate 110 contacts the second gasket 108 such that the second gasket is sandwiched between the mounting plate 104 and the backing plate 110. The first gasket 106 is sandwiched between the camera 102 and the mounting plate 104.

Together, the first gasket, 106, the mounting plate 104, the second gasket 108 and the backing plate 110 form a vibration damping sandwich. Each layer in this sandwich includes a central aperture. The apertures are aligned when the sandwich is formed such that the camera mounting stud 112 can pass through the sandwich in a direction perpendicular to the orientation of the sandwich layers.

The mounting stud 112 is threaded. A first spacer nut 114 is disposed over the stud and located against the gasket side of the backing plate 110. The flange diameter of the spacer nut 114 is larger than the aperture diameter of the backing plate 110 to prevent the nut 114 from passing through the backing plate 110.

A second spacer nut 116 is disposed over the stud 112 and located inside of the aperture of the first gasket 106 with the nut's flange facing towards the camera 102. The second spacer nut 116 defines a stop against which the camera can be tightened.

A thumb nut or fastener 118 is threaded over an end of the stud 112 opposite the end where the camera attaches. The thumb nut 118 secures the backing plate 110 in place. As shown in FIG. 1, the thumb nut 118 includes a forward flanged portion to prevent it from passing through the center aperture in the backing plate 110. However, as shown in FIG. 9, the same function can be accomplished with a separate washer 119 disposed between the thumb nut 118 and the backing plate 110.

Figure 21:
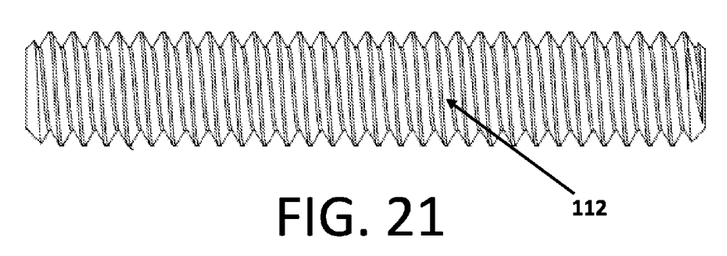
FIG. 21 is a side view of a threaded camera mounting stud of a camera mounting system according to certain embodiments.

Most cameras include a standard threaded recessed aperture in their bodies. This allows the camera 102 to be threaded onto the stud 112 until it is secured against the second spacer nut 116. The 112 stud is shown in further detail in FIG. 21. The 112 stud is an elongated cylindrical shaft with spiral threading across its outer cylindrical surface.

In use, the first and second nuts 114, 116 and the thumb nut 118 are adjusted along the stud 112 until the first gasket 106 is slightly compressed between the camera 102 and the mounting plate 104, and the second gasket 108 is slightly compressed between the mounting plate 104 and the backing plate 110. When configured properly, the camera 102 does not easily wiggle against the adjacent gasket 106.

The gaskets 106, 108 of the vibration dampening sandwich described above isolate the camera 102 from, or dampen out, vibrations caused by vehicle vibrations and wind buffeting that would otherwise cause wobble defects such as the jello effect in recorded high definition (HD) video. Using only one gasket layer in the sandwich would not be as effective because the mounting stud or post 112 would transmit vibrations from the vehicle to the camera 102. The second gasket 108 functions to isolate the mounting stud 112 from such vibrations.

A wide variety of cameras, including HD video and still cameras, can be used with the invention without departing from the scope of the invention. However, the jello effect has been found to be most pronounced for HD cameras using CMOS image sensors. Thus, CMOS-based HD video cameras may benefit most from the present mounting assembly or system 100.

The mounting plate 104 includes a flange 120 or extension portion that extends outward from the edges of the sandwich. The flange 120 allows for fastening the camera mounting assembly 100 to a structure or to an adjustable arm or other assembly.

In one alternative embodiment, the mounting plate 104 can be a surface (e.g. outer surface panel) of the vehicle or aircraft itself. Thus, the camera can be mounted in a low profile manner.

In another alternative, the camera mounting assembly 100 can be coupled to an adjustable mounting assembly as shown in FIGS. 3-9. More particularly, the camera mounting assembly 100 is fastened to an adjustable angle block 122. The angle block 122, which is shown in greater detail in FIGS. 10-12, includes a vertical mounting portion 124 and a horizontal mounting portion 126. Each such portion includes a respective central aperture 128, 130 and a plurality of smaller apertures 132 radially arrayed about the respective central aperture.

Figure 19:
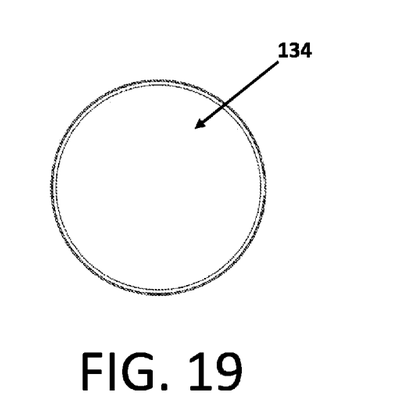
FIG. 19 is an end view of a mounting fastener of a camera mounting system according to certain embodiments.
Figure 20:
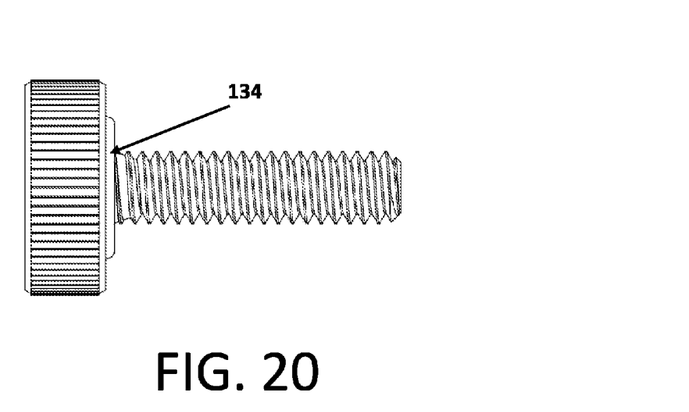
FIG. 20 is a side view of a mounting fastener of a camera mounting system according to certain embodiments.
Figure 22:
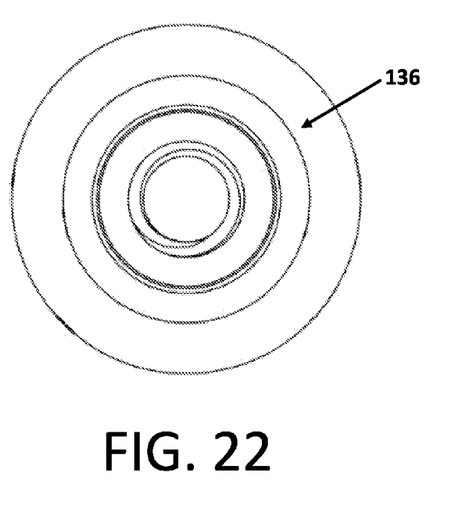
FIG. 22 is an end view of a thumb nut of a camera mounting system according to certain embodiments.
Figure 23:
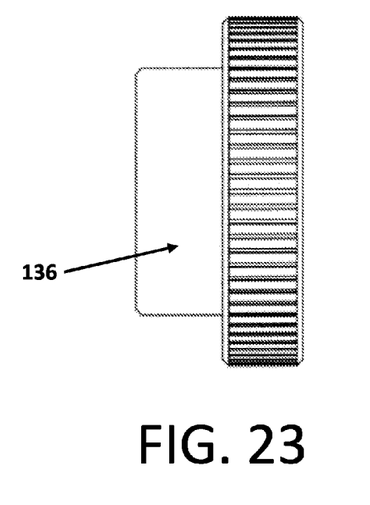
FIG. 23 is a side view of a thumb nut of a camera mounting system according to certain embodiments.

The camera mounting assembly 100 is secured to the angle block 122 by a thumb screw 134 that is inserted through the aperture in the flange of the mounting plate 104 and the aperture 130 through the vertical mounting portion 124 of the angle block. A thumb nut 136 is threaded over the threaded portion of the thumb screw 134 to secure the mounting plate 104 to the angle block 122. The thumb screw 134 is shown in further detail in FIGS. 19-20, and the thumb nut 136 is shown in further detail in FIGS. 22-23.

Further features can be provided to both the flange 120 and the vertical surface portion 124 to prevent the mounting flange from rotating about the thumb screw 134 with respect to the angle block 122. These features, in one embodiment, are the plurality of radially arrayed small apertures 132 in the angle block 122, and a corresponding array of small apertures 138 through the flange 120 of the mounting plate 104 around a central larger aperture 139 (shown in FIGS. 9 and 17). When the respective apertures 132 and 138 are aligned, screws (not shown) can be inserted through one or more of the aligned apertures to lock the rotational position of the mounting plate 104 into place. Because the apertures 132 and 138 are radially distributed along circles with identical diameters, the rotational positon of the camera can be adjusted to multiple possible rotational orientations depending on the number of defined apertures.

In an alternative embodiment, each of the vertical portion 124 of the angle block 122 and the flange 120 of the mounting plate 104 are provided with a respective locking disc. This configuration provides fixed locking detents at various positions of rotational travel (e.g. every 8 degrees). The number of teeth or ridges define the resolution of the adjustment. The discs lock securely together when the thumb nut is tightened.

Figure 10:
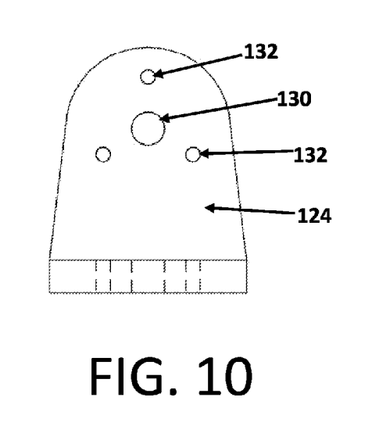
FIG. 10 is a front view of an angle block of a camera mounting system according to certain embodiments.
Figure 11:
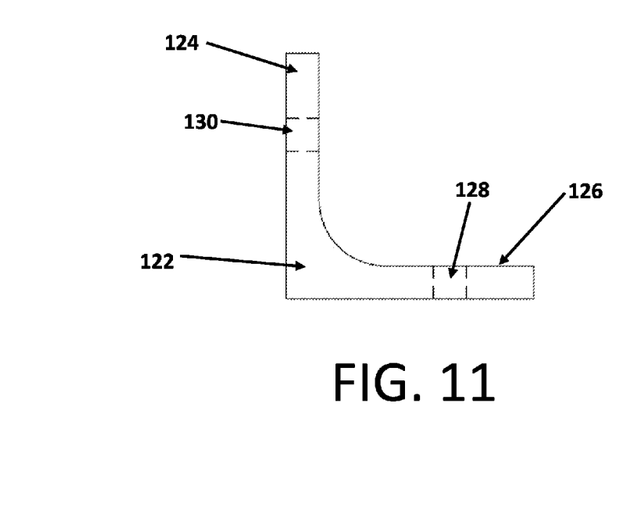
FIG. 11 is a back view of an angle block of a camera mounting system according to certain embodiments.
Figure 12:
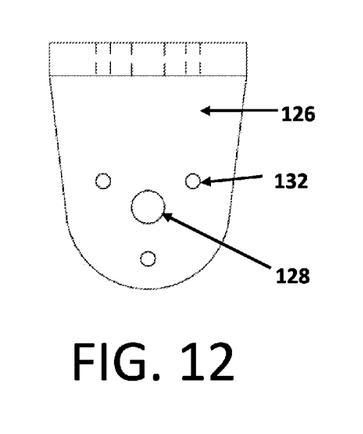
FIG. 12 is a side view of an angle block of a camera mounting system according to certain embodiments.

Horizontal mount portion 126 of angle block 122 includes an aperture 128 and series of smaller apertures 132 radially arrayed about the main aperture 128. These features allow the angle block to mount to a wide variety of surfaces and other mounting hardware. Slots or other alternative shapes can be defined in the horizontal portion 126 without departing from the scope of the invention.

Figures 13, 14:
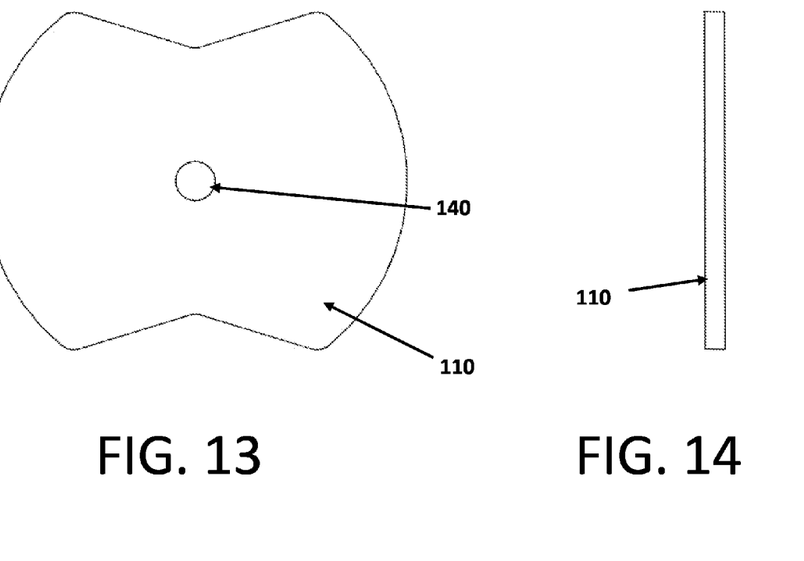
FIG. 13 is a front view of a backing plate of a camera mounting system according to certain embodiments.
FIG. 14 is a side view of a backing plate of a camera mounting system according to certain embodiments.

The backing plate 110 is shown in further detail in FIGS. 13-14. The plate 110 is shaped to cover the outer perimeter of the second gasket 108. A central aperture 140 has a diameter sufficiently large to allow the camera mounting stud 112 to pass, but small enough that the thumb nut 118 (or a washer) cannot pass through. The backing plate 110 is rigid so that it relatively evenly distributes forces to and from the second gasket 108 and to the camera mounting stud 112. Rigid plastic materials, metals (e.g. 6061 anodized aluminum), carbon fiber, or other rigid materials are all suitable for forming the backing plate.

Figure 15:
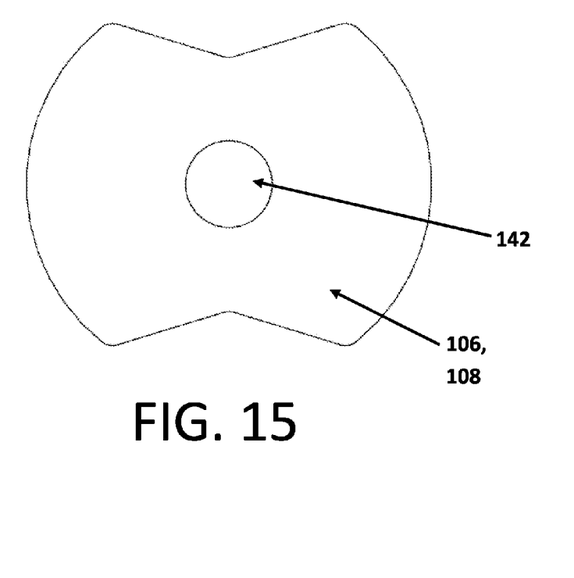
FIG. 15 is a front view of a gasket of a camera mounting system according to certain embodiments.
Figure 16:
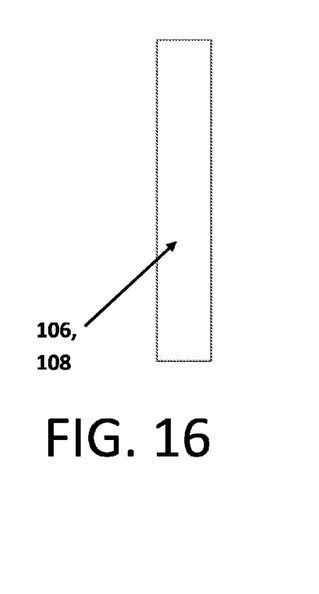
FIG. 16 is a side view of a gasket of a camera mounting system according to certain embodiments.

FIGS. 15-16 show further detail of the gaskets 106 and 108. In one embodiment, both gaskets are identical dimensionally and in material. However, other embodiments can vary the respective dimensions and material selection so that each gasket is different in some respect.

The gaskets 106, 108 are generally elongated to provide support for the entire contact surface of the camera's body. This spreads out the pressure across the entire camera and aids in stability. However, the shape and size of the gaskets can be varied to match up to various sizes and styles of cameras. The gaskets are generally planar and include a central aperture 142. The aperture is large enough to allow the spacer nuts to pass though the gasket.

One suitable material for the gasket is a synthetic viscoelastic urethane polymer such as sorbothane that has a durometer of 40. Another suitable material is closed cell polyurethane such as Sylodyn GC. The gasket material and durometer (hardness) are selected to address vibrations in the ranges encountered in typical applications of cameras that would lead to wobble effects. For example, the sorbothane material with a durometer of 40 has been tested in the present invention as eliminating vibration frequencies encountered on a variety of aircraft, automobiles, and ATV's. However, different materials such as rubber and/or materials with other durometer properties may be better suited to particular applications. Thus both material and durometer can be altered without departing from the scope of the invention.

Figure 17:
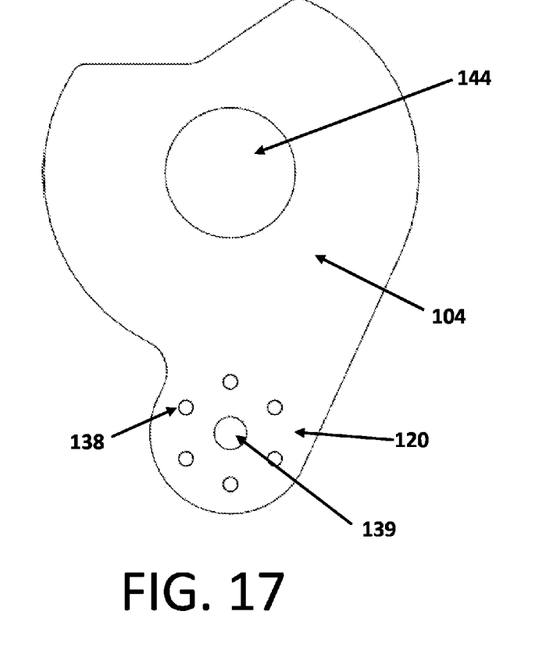
FIG. 17 is a front view of a mounting plate of a camera mounting system according to certain embodiments.
Figure 18:
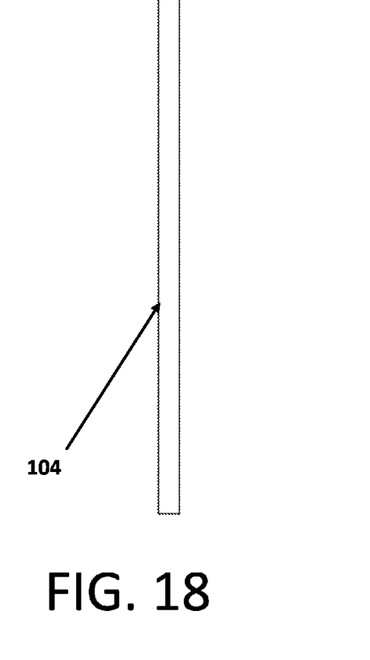
FIG. 18 is a side view of a mounting plate of a camera mounting system according to certain embodiments.

The mounting plate 104 is shown in further detail in FIGS. 17-18. The plate 104 is generally planar, and comprises an upper body portion to form the sandwich and a flange portion 120 extending outwardly therefrom. The upper body portion includes an aperture 144 having a diameter large enough to allow the spacer nuts 114, 116 to pass through. The material forming the mounting plate 104 can be the same as used for the backing plate.

Figure 24:
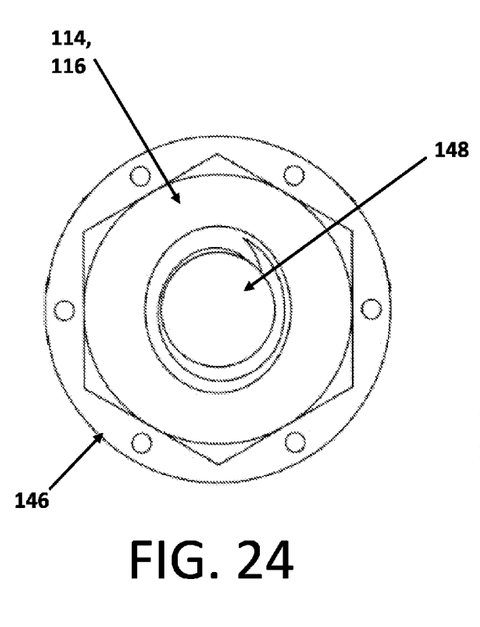
FIG. 24 is an end view of a spacer nut of a camera mounting system according to certain embodiments.
Figure 25:
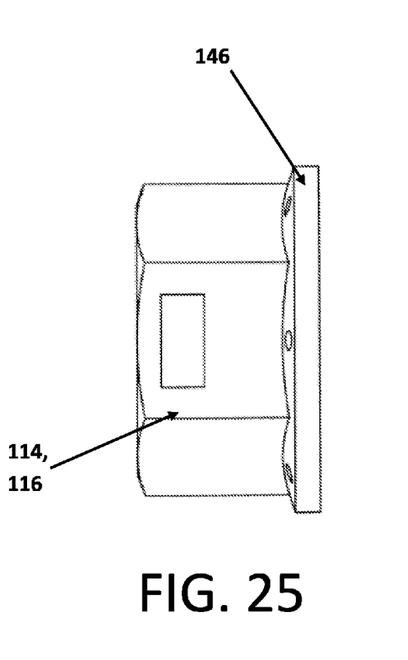
FIG. 25 is a side view of a spacer nut of a camera mounting system according to certain embodiments.

The spacer nuts or fasteners 112, 114 can be identical, though they need not be. As shown in more detail in FIGS. 24-25, the thumb nuts 112, 114 each include a flanged side and an opposing faceted side. The flange 146 of the flanged side has a diameter that is greater than the maximum diameter of the faceted side. A central threaded aperture 148 extends through the nuts.

According to certain aspects, the mounting hardware other than the gaskets can be formed of an aluminum alloy. Plastic camera mounts can flex or fail at high vehicle speeds. Forming the components of 6061 aluminum, for example, addresses this issue by rigidly holding the camera still in the most extreme conditions. Aluminum version of the disclosed mounting device have been tested at over 300 kts with no camera movement.

According to certain aspects the camera mounting assembly 100 provides for universal mounting capability. The user can fasten the flanged portion 120 of the mounting plate to any mount, such as angle block 122, or any surface of a vehicle or aircraft. For example the user can mount the angle block 122 to an existing inspection cover to turn it into a mount point.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A camera mounting system, comprising:
   a mounting plate including a first side, an opposing second side, an upper body portion and a flange portion adjacent to the upper body portion, the upper body portion including a central aperture defined therethrough;
   a first gasket including a first side and an opposing second side, the first side of the gasket disposed against the first side and upper body portion of the mounting plate, the first gasket including a central aperture defined therethrough;
   a second gasket including a first side and an opposing second side, the first side of the gasket disposed against the second side and upper body portion of the mounting plate, the second gasket including a central aperture defined therethrough;
   a backing plate including a first side and an opposing second side, the first side of the backing plate disposed against the second side of the second gasket, the backing plate including a central aperture defined therethrough;
   a camera mounting stud disposed through the central aperture of each of the first gasket, the second gasket, the upper body portion of the mounting flange, the second gasket and the backing plate;
   a rear nut coupled to the mounting stud and disposed adjacent to the second side of the backing plate; and
   a high definition video camera coupled to the mounting stud and contacting the second side of the first gasket, wherein the first gasket and the second gasket each comprise a vibration dampening material.

2. The system of claim 1, wherein the mounting stud comprises an elongated cylindrical body with a spiral threading across an outer cylindrical surface thereof.

3. The system of claim 1, wherein the first gasket and the second gasket each comprise a viscoelastic urethane polymer.

4. The system of claim 1, further comprising a washer disposed between the nut and the backing plate.

5. The system of claim 1, wherein the high definition video camera includes a complementary metal oxide semiconductor (CMOS) image sensor.

6. The system of claim 1, further comprising a first spacer nut coupled to the mounting stud and contacting the first side of the backing plate.

7. The system of claim 6, further comprising a second spacer nut coupled to the mounting stud and disposed at least partially within the central aperture of the first gasket.

8. The system of claim 1, further comprising an adjustable angle block, the adjustable angle block including a vertical mounting portion and a horizontal mounting portion extending at a right angle from the vertical mounting portion.

9. The system of claim 8, wherein the vertical mounting portion includes a central aperture defined through the vertical mounting portion and a plurality of smaller apertures radially arrayed about the central aperture and extending at least partially though the vertical mounting portion.

10. The system of claim 1, wherein the flange portion of the mounting plate includes a central aperture defined through the mounting plate and a plurality of smaller apertures radially arrayed about the central aperture and extending at least partially though the mounting plate.

11. The system of claim 1, further comprising:
    an adjustable angle block, the adjustable angle block including a vertical mounting portion and a horizontal mounting portion extending at a right angle from the vertical mounting portion,
    wherein the flange portion of the mounting plate includes a central aperture defined through the mounting plate and a plurality of smaller apertures radially arrayed about the central aperture and extending at least partially though the mounting plate, and
    wherein the mounting plate is secured to the adjustable angle block by a fastener disposed through the central aperture of the vertical mounting portion of the adjustable angle block and though the central aperture of the flange portion of the mounting plate.

12. A vibration attenuating camera mounting assembly for a high definition video camera, the assembly comprising:
    a rigid backing plate;
    a mounting plate including a first side and a second side;
    a first vibration dampening gasket disposed between the backing plate and the mounting plate, and contacting the first side of the mounting plate;
    a second vibration dampening gasket disposed adjacent to and contacting the second side of the mounting plate;
    a mounting stud extending through each of the backing plate, the mounting plate, the first vibration dampening gasket and the second vibration dampening gasket; and
    a fastener coupled to the mounting stud and disposed adjacent to the backing plate,
    wherein the high definition video camera is coupled to the mounting stud and is in contact with the second gasket.

13. The assembly of claim 12, wherein the mounting stud comprises an elongated cylindrical body with a spiral threading across an outer cylindrical surface thereof.

14. The assembly of claim 12, wherein the first vibration dampening gasket and the second vibration dampening gasket each comprise a viscoelastic urethane polymer.

15. The assembly of claim 12, further comprising a spacer nut coupled to the mounting stud and disposed at least partially within a central aperture formed in the first gasket.

16. The assembly of claim 12, further comprising an adjustable angle block coupled to the mounting plate, the adjustable angle block including a vertical mounting portion and a horizontal mounting portion extending at a right angle from the vertical mounting portion.

17. A method of reducing rolling shutter distortion effects in high definition video recordings; the method comprising:
    disposing a first vibration dampening gasket on a first side of a mounting plate so that an inner surface of the first vibration dampening gasket contacts the mounting plate;

disposing a second vibration dampening gasket on a second side of the mounting plate so that an inner surface of the second vibration dampening gasket contacts the mounting plate;

disposing a rigid backing plate against an outer surface of the second vibration dampening gasket;

inserting a camera mounting stud through a central aperture extending through each of the mounting plate, the backing plate, the first vibration dampening gasket and the second vibration dampening gasket;

coupling a high definition video camera to a first end portion of the camera mounting stud;

coupling a fastener to a second end portion of the camera mounting stud, the second end portion being opposite the first end portion; and tightening the fastener to secure the high definition video camera against an outer surface of the first vibration dampening gasket.

18. The method of claim 17, further comprising fastening a flange portion of the mounting plate to a vertical mounting portion of an adjustable angle block.

19. The method of claim 18, further comprising:

adjusting a camera mount angle of the mounting plate relative to the adjustable angle block; and securing the flange portion of the mounting plate to the vertical mounting portion of the adjustable angle block so that the camera mount angle cannot unintentionally change.

* * * * *